(12) United States Patent
Reekmans et al.

(10) Patent No.: US 6,686,417 B1
(45) Date of Patent: Feb. 3, 2004

(54) SURFACTANT COMPOSITION FOR INVERSE EMULSION POLYMERIZATION OF POLYACRYLAMIDE AND PROCESS OF USING THE SAME

(75) Inventors: Steven Irene Jozef Reekmans, Brussels (BE); Phillip Cornet, Overijse (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/261,526

(22) Filed: Mar. 3, 1999

Related U.S. Application Data

(63) Continuation of application No. PCT/GB97/02255, filed on Aug. 22, 1997.

(30) Foreign Application Priority Data

Sep. 3, 1996 (GB) .............................................. 9618332

(51) Int. Cl.[7] .............................. C08F 2/32; C08F 20/56; C02F 1/56
(52) U.S. Cl. ...................... 524/801; 524/277; 524/310; 524/313; 524/763; 524/812
(58) Field of Search ................................ 524/310, 313, 524/801, 812, 827, 277, 763

(56) References Cited

U.S. PATENT DOCUMENTS

| | | | | | |
|---|---|---|---|---|---|
| 4,151,304 | A | * | 4/1979 | Evans | ........................ 424/361 |
| 4,722,757 | A | * | 2/1988 | Cooper et al. | ................. 149/2 |
| 4,786,681 | A | * | 11/1988 | Baker et al. | ................. 524/710 |
| 5,232,688 | A | * | 8/1993 | Ziegler et al. | ................. 424/59 |

FOREIGN PATENT DOCUMENTS

| | | | | |
|---|---|---|---|---|
| EP | 000424 | * | 7/1977 | ........... C08G/63/66 |
| EP | 000 424 | | 1/1979 | |
| EP | 623 630 | | 11/1994 | |
| WO | WO 95/32227 | * | 11/1995 | |

* cited by examiner

*Primary Examiner*—David W. Wu
*Assistant Examiner*—Kelechi C. Egwim
(74) *Attorney, Agent, or Firm*—Pillsbury Winthrop LLP

(57) ABSTRACT

Polyacrylamide is made by inverse emulsion polymerisation using an oil phase including at least one ester based oil, particularly a vegetable oil, using a primary emulsification system including a polymeric carboxylic surfactant; a low HLB emulsifier; and an oil phase structurant, particularly an ester wax such as beeswax. The use of the combination emulsifier enables the use of vegetable oils especially rape seed (including canola) oil as the continuous in the polymerisation step.

43 Claims, No Drawings

SURFACTANT COMPOSITION FOR INVERSE EMULSION POLYMERIZATION OF POLYACRYLAMIDE AND PROCESS OF USING THE SAME

This is a continuation under 35 U.S.C. Section 120 of International application Serial number PCT/GB97/02255 filed on Aug. 22, 1997 which application designates the US.

The present invention relates to a method for making polyacrylamide and in particular by the inverse emulsion polymerisation method using a particular combination of surfactants and to the use of such polymers in waste water treatment, as a flocculant or a dehydrating agent, in paper manufacturing as a paper chemical or sizing agent, or in oil recovery and textile printing as thickeners.

Major industrial uses of polyacrylamide (PAM) include uses in aqueous systems and for such use it is desirable for the PAM to be available as an aqueous solution. Unfortunately, except at extreme dilution, aqueous solutions of PAM usually have very high viscosity. The handling of systems with such high viscosities is difficult on a large scale and so the industrial manufacture of PAM is usually carried out is an indirect manner.

Typically, PAM is made by so-called inverse emulsion polymerisation. In this, acrylamide monomer, together with any co-monomer(s), and a polymerisation initiator, usually a free radical initiator, are dissolved in water, this solution is emulsified in an oil and the polymerisation initiated, typically by raising the temperature. The water-in-oil emulsion is typically stabilised by a surfactant system. At the end of polymerisation the system is a dispersion of water droplets, containing dissolved PAM, in the oil phase. Although the viscosity of the aqueous PAM solution is high, the effective viscosity of the emulsion is determined primarily by that of the oil and this is chosen to be suitably low. To introduce the PAM effectively into the aqueous systems in which it is to be used, the emulsion has to be broken. Typically, the system is designed so that it undergoes inversion on simple dilution into water. This general type of synthetic method is usually referred to as inverse polyacrylamide emulsion polymerisation, commonly abbreviated to "inverse PAM polymerisation".

The requirements for the surfactant system used in inverse PAM polymerisation are thus somewhat unusual because it must provide adequate emulsion stability before, during and after (for storage) the polymerisation reaction, but must permit ready breaking of the emulsion during inversion on dilution into water, to facilitate rapid release of the polyacrylamide polymer into the water phase in which it will act.

Conventionally, the oil used in the emulsion polymerisation process has been mineral oil and the limited biodegradability of mineral oils in the end uses has led to moves towards the use of biologically sourced oils, particularly vegetable oils in the end use products. Unfortunately, carrying out the emulsion polymerisation using a continuous phase of vegetable oil has not to date proved successful, although it has been possible, at extra cost, to replace the mineral oil with vegetable oil after emulsion polymerisation for example by distilling off the mineral oil and replacing it with vegetable oil.

The present invention is directed to a way of making water-in-oil emulsion polymerised PAM which enables ester based oils, particularly ester oils derived from vegetable sources, to be used as or included as major components of the oil (continuous) phase of the emulsion. The invention is particularly desirably applied where the ester oil, especially one derived from a vegetable source, is the major and desirably substantially the only oil used in the emulsion polymerisation To do this successfully we use a combination of three surfactant t materials, a polymeric surfactant, a low HLB emulsifier and a long chain fatty acid or ester as an oil phase structurant. Within specific ranges of proportions, we have found that such as combination can enable successful polymerisation without excessive loss of polymer through coagulation and give emulsion products having satisfactory inversion properties on dilution into water. The method enables the manufacture of anionic cationic and non-ionic inverse PAM emulsion polymers.

Accordingly the invention provides a method of making polyacrylamide by inverse emulsion polymerisation which comprises dispersing an aqueous solution of polymerisable monomers including acrylamide in an oil phase including at least one ester based oil, particularly one or more vegetable oils, the system also including a surfactant composition which includes:

a polymeric carboxylic surfactant;

b a low HLB emulsifier; and c an oil phase structurant, and polymerising the polymerisable monomers to form a colloidal suspension of particles, of a solution or dispersion of the resulting polyacrylamide polymer in water, in the oil.

The invention includes a surfactant combination including: a) a polymeric surfactant; b) a low HLB emulsifier; and c) an oil phase structurant, and the use of the surfactant combination in inverse emulsion polymerisation of polyacrylamides.

The invention further includes a method of water treatment that comprises diluting an inverse polyacrylamide emulsion, made by the method or made using a surfactant combination of the invention, into the water to be treated such that the emulsion is inverted releasing the polyacrylamide into the water and emulsifying the ester based oil phase in the dilution water. The term inverse polyacrylamide emulsion refers to a solution of a polyacrylamide polymer or copolymer in an aqueous solvent, usually water, as the disperse phase of a water-in-oil emulsion. In the inverse polyacrylamide emulsion made by the present invention the oil phase is an ester based oil, particularly a vegetable oil.

The polymeric carboxylic surfactant is an oil soluble, and usually water insoluble, surfactant which includes a polymeric hydrophobe group, containing at least 30 carbon atoms, linked to a carboxyl function itself further linked to a hydrophile group. Examples of suitable polymeric hydrophobe groups include polymeric hydrocarbyl groups and polyester groups.

When the hydrophobe is a hydrocarbyl polymeric group it typically, contains at least 30, and usually at least 50, carbon atoms and may contain up to 1000, more usually up to 500 carbon atoms. The hydrocarbyl polymeric group is typically based on an olefin polymer. Particularly suitable monomers are butylenic monomers especially iso-butylene. The hydrocarbyl group may be linked directly to the carboxyl group or indirectly through a linking group. An especially convenient way of linking the hydrocarbyl to the carboxyl group is to link the hydrocarbyl group to a succinic acid group. The succinic acid group provides two carboxyl functions and there are two other carbon atoms to which the hydrocarbyl group can be linked. Such compounds can be made by a condensation reaction between the corresponding hydrocarbyl olefin and maleic anhydride to give a hydrocarbyl substituted succinic anhydride that can be further reacted to make the surfactant In such compounds, at least one of the carboxyl groups of the succinic acid group is linked to a hydrophile group. The other one may be a free carboxyl group or linked directly or indirectly to a further hydrophile group.

When the hydrophobe is a polyester group, it will typically be a polyester derived from a hydroxy fatty acid, particularly a hydroxy $C_{12}$ to $C_{20}$ fatty acid such as hydroxystearic acid (usually 12-hydroxystearic acid). The polyester group will typically on average contain from about 50 to about 200 carbon atoms, more usually about 100 to 150, and especially about 115 to 135, carbon atoms. Because commercially available hydroxystearic acid typically contains about 15% stearic acid, polymerisation to form the polyester typically results in a polyester product containing on average no more than about 7 hydroxystearate residues.

The hydrophile group can be a short chain hydrophile group in particular one derived from an alcohol or polyol, an amine or polyamine, a compound containing both amine and hydroxyl groups, optionally including other groups such as carboxyl groups, or functional derivatives of such amino-, or hydroxyl, or carboxyl groups.

Alternatively, the hydrophile group can be a polymeric hydrophile group e.g. a polyalkylene glycol group, particularly a polyethylene glycol group. In this case the polyalkylene glycol group may be hydroxyl ended or it may have a further hydrocarbyl group e.g. a hydrocarbyl substituted succinic anhydride group, linked to the end of the chain.

Generally, where the hydrophobe is a hydrocarbyl polymeric group, the hydrophile can be a short chain hydrophile group or a polymeric hydrophile group and where the hydrophobe is a polyester group, the hydrophile will be a polymeric hydrophile group, particularly a polyethylene glycol group.

Particular polymeric carboxylic surfactants which can be used in the invention may be represented by the general formula (I):

$$R^1.X_n.CO.R^2 \quad (I)$$

where
- $R^1$ is a polymeric hydrophobe group containing the least 30 carbon atoms, particularly a $C_{30}$ to about $C_{500}$ hydrocarbyl group, which may be saturated or unsaturated and is desirably a polyisobutylenyl group, or a polyester group containing about 50 to about 200 carbon atoms, and is desirably a poly(hydroxy fatty acid) ester group, especially a polyhydroxystearate group;
- X is a linking group, particularly such that the linking group and the carbonyl group together form a succinic acid group;
- n is 0 or 1; and
- $R^2$ is a hydrophile group.

Specific types of polymeric carboxylic surfactant that can be used in the invention include:

A block polyester polyalkylene glycol copolymers particularly of the formula (II):

$$A\text{---}B\text{---}A \quad (II)$$

where
- each group A is independently a monocarboxylate group of a polyester, particularly one of the formula: (IIa):
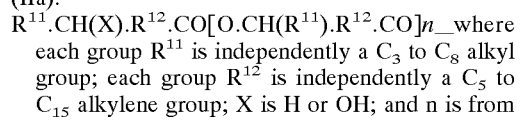
$R^{11}.CH(X).R^{12}.CO[O.CH(R^{11}).R^{12}.CO]n$__where each group $R^{11}$ is independently a $C_3$ to $C_8$ alkyl group; each group $R^{12}$ is independently a $C_5$ to $C_{15}$ alkylene group; X is H or OH; and n is from 3 to 10, and particularly where the group A is a polyhydroxystearate group with n about 7; and
- B is a divalent polyalkylene oxide, particularly a polyethylene oxide, residue.

Such block polyester copolymer surfactants are described in EP 00004242 A.

B long chain hydrocarbyl substituted succinic acid derivatives of hydrophile compounds, especially where the hydrocarbyl group is a polyisobutylene group and the hydrophile compound is ethylene glycol, propylene glycol, glycerol, ethanolamine, diethanolamine, or a polyamine, glycolic acid and/or glycine or a derivative thereof with phosphoric, sulphuric, chlorosulphonic, sulphamic, or a haloalkyl-sulphonic or haloalkyl- or haloaryl-phosphoric or haloalkanoic acid, particularly those described in US 4786681.

C complex esters made by reacting long chain hydrocarbyl substituted succinic acids, especially where the hydrocarbyl group is a polyisobutylene group, and polyalkylene glycols and other ingredients such as polyhydric alcohols and monocarboxylic acids; in particular such materials as described in GB 2017719 B.

The polymeric carboxylic surfactants are relatively hydrophobic surfactants and typically have HLB values in the range 5 to 8 and particularly 6 to 7.

The low HLB i.e. relatively hydrophobic/lipophillic, emulsifier is a type of emulsifier commonly used in inverse PAM polymerisation systems, which typically have HLB values in the range 1.5 to 7.5, desirably from 2 to 6. Suitable low HLB emulsifiers include sorbitan fatty acid esters, specifically mono, sesqui, and/or tri-fatty acid esters, particularly $C_{14}$ to $C_{20}$ mono-unsaturated fatty acid, especially oleic acid, esters and in particular sorbitan mono-oleate; glycerol mono and/or di-fatty acid esters, particularly $C_{14}$ to $C_{20}$ mono-unsaturated fatty acid, especially oleic acid, esters; and fatty acid alkanolamides, particularly ethanolamides, especially diethanolamides, particularly those based on $C_{14}$ to $C_{20}$ mono-unsaturated fatty acids, especially oleic acid. The oleic acid in such compounds may be provided by mixed fatty acid feedstocks e.g. rape seed fatty acids, including $C_{14}$ to $C_{20}$ mono-unsaturated fatty acid, particularly oleic acid, as a main constituent. Particular examples of such emulsifiers include those available under the Trade Mark Span e.g. Span 80, from ICI Surfactants.

The relative hydrophobicity of the polymeric carboxylic surfactants and the low HLB emulsifier means that they can readily be used in combination in emulsifying water-in-oil emulsions.

The oil phase structurant is a material that stabilises the oil phase of the emulsion. Generally it will be a waxy ester, solid at ambient temperature, and in which either or both the fatty acid residue and the alcohol residue are long chain residues, typically having more than 20 carbon atoms, and desirably 24 or more carbon atoms. Generally such esters contain at least 30 carbon atoms overall.

Mixtures of such esters with other compounds, particularly free fatty acids and other esters, such as occur in some sources, can also be effective. Suitable waxes include beeswax, jojoba wax and montan wax and their mixtures.

Beeswax is a mixture of waxy esters, free waxy fatty acids and hydrocarbons. The waxy esters are typically more than 70% by weight of the beeswax and are mainly fatty acid esters, typically palmitic (tetradcecanoic) acid and cerotic (hexacosanoic) acid and of long chain, typically $C_{30}$ to $C_{32}$) alcohols, with minor amounts of diesters and hemi esters of such alcohols with dicarboxylic acids. The free fatty acids are typically mainly $C_{23}$ to $C_{33}$ acids and the hydrocarbons mainly $C_{25}$ to $C_3$, compounds. Typically beeswax has a melting point of about 65° C.

Jojoba oil is the ester of $C_{20}$ to $C_{22}$ mono-unsaturated fatty acids with $C_{20}$ to $C_{22}$ alcohols. In effect Jojoba oil is a liquid wax and Jojoba wax is typically made by hydrogenation of jojoba oil. Jojoba wax typically has a melting point of about 70° C.

Montan wax is a mixture of waxy esters and free wax acids, with small quantities of free alcohols and ketones and, in the crude product, about 25% of resinous and asphaltic material, but in refined products generally there are only minor impurity levels of the resinous and asphaltic materials. In refined waxes, the waxy esters are typically more than 65% by weight and are mainly fatty acid esters, typically of long chain, mainly $C_{20}$ to $C_{30}$, acids and of long chain, typically $C_{24}$ to $C_{32}$, alcohols, with significant amounts (about a quarter) of the esters being of hydroxy acids e.g. $C_{28}$, acids. The free fatty acids, comprising rather more than a quarter of the product, are typically mainly $C_{23}$ to $C_{33}$ acids, and the free alcohols, mainly $C_{24}$ and $C_{26}$ compounds, and ketones, mainly $C_{25}$ and $C_{27}$ compounds, are about 5 to 10% by weight of the product. Typically refined montan wax has a melting point of 82–83° C.

Some synthetic derivatives of the above waxes can also act as oil phase structurants for example: ethoxylated sorbitol esters of beeswax fatty acids, such as 20 EO and 6 EO sorbitol beeswax derivatives; or triglycerol tri-beeswax fatty acid esters such as 'Cera Bellina': polyglyceryl-3-beeswax sold by Jan Dekker Int (m.p. 63–67° C.); ethylene glycol esters of montan wax fatty acids (also known as montanic acid), such as Hoechst wax E (m.p. ca 82° C.), glycerol esters of montanic acid, such as Hostalub WE 4; and Hoechst wax OP, which is described as montanic acid partially esterified with butylene glycol and saponified with Ca hydroxide (m.p. ca 100° C.)

The wax derivatives can be used alone or in combination with the waxy esters themselves.

We do not fully understand why these waxes work to stabilise the emulsions. However, it is possible that solid particle stabilisation (the so-called "pickering effects") may play a part in the effective stabilisatiof The waxes that act as oil phase structurants usually have melting points in the range 60–85° C., more usually in the range 62–83° C.

The term "ester based oil" refers to an ester, which is liquid at ambient temperature, and desirably at modestly subambient temperatures, of a $C_{12}$ to $C_{20}$ fatty acid (monocarboxylic acid) with a $C_1$ to $C_{10}$ hydroxyl compound. In particular, it refers to such ester oils of vegetable origin and to (net) trans-esterification products of such oils with $C_1$ to $C_{10}$ alcohols. Desirably the fatty acid is a $C_{14}$ to $C_{18}$ mono-unsaturated fatty acid, particularly oleic acid. It is desirable that the ester based oil has a low content of di- or more highly unsaturated fatty acids as the presence of such acids may have adverse effects in the polymerisation reaction, particularly by acting as radical scavengers or in a tendency for the oil itself to polymerise. In terms of oleic acid it is thus desirable that the oil contains low or zero levels, particularly less than 10% linoleic and less than 5% linolenic acid residues. Desirably, the oil contains at least 60 and more desirably, at least 70% oleic acid residues.

The hydroxyl compound can be a monohydroxyl compound such as $C_1$ to $C_{10}$ monohydric alcohol, or a polyhydroxyl compound such as glycerol, as will be the case for the vegetable oils as such. Desirably the hydroxyl compound is either glycerol or methyl, ethyl, butyl, iso-butyl, or ethylhexyl alcohol. In the ester based oil, it is desirable that there are substantially no free hydroxyl groups, in particular, the hydroxyl compound does not contribute free hydroxyl groups, and desirably all the hydroxyl groups of the hydroxyl compound are esterified with the carboxylic acid.

In products of vegetable origin, whether the oils as such or products made from the vegetable oils, the fatty acids will typically be a mixture, often including residues of different chain length and of differing degree of saturation or unsaturation, depending on the particular vegetable source used. Such mixtures are included for use in this invention. Suitable oils include high oleic sunflower oil, soya oil, peanut oil and, particularly, rape seed oil. Some varieties of oil seed rape yield oils having a significant content of erucic acid ($C_{22}$ mono-unsaturated fatty acid) residues. In this invention, it is desirable that the ester oil does not include significant amounts of erucic acid, in particular the proportion of erucic acid residues is desirably less than 2%. Low erucic acid rape seed oil is commercially available and, particularly in North America, is sometimes known as canola oil. The use of rape seed oil or canola oil or of the methyl ester of rape seed oil or canola oil fatty acids forms a specific subsidiary aspect of this invention.

The advantages of using vegetable oils include that they are from renewable sources, they are readily biodegradable, much more so than conventional paraffinic, particularly iso-paraffinic, oils and they have higher densities than paraffinic oils. The higher density is important in that it reduces the driving force behind sedimentation and/or creaming of the emulsion (before, during and after polymerisation). For example the density (specific gravity relative to water) at 20° C. of typical iso-paraffin is 0.78 and that of rape seed oil is 0.92. For mono-ester oils, the density is intermediate these values e.g. rape seed fatty acids methyl ester (mainly methyl oleate) has a specific gravity of about 0.85.

Examples of commercially available ester based oils that we have successfully used in the method if this invention are oils of vegetable or mainly vegetable origin including rape seed oil, high oleic content sunflower oil, Canola oil, methyl oleate, either as methyl ester of rape seed oil fatty acids or produced by direct esterification of oleic acid, and synthetic ester oils including isobutyl laurate and $C_8$–$C_{12}$ fatty acid-2-ethylhexylester.

The oil phase used in the method of the invention may include other oils as well as the ester based, particularly vegetable oil(s). Such other oils include paraffinic, particularly iso-paraffinic oils. When used in mixtures the proportion of the ester based oil will usually be at least 300%, more usually at least 40% and desirably at least 75% by weight of the oil phase used.

The three components of the surfactant system of and used in this invention are typically used in counts in the following ranges:

| component | broad range | narrow range |
| --- | --- | --- |
| a - polymeric carboxylic surfactant | about 30 to about 55 | about 35 to about 50 |
| b - low HLB emulsifier | about 20 to about 45 | about 25 to about 40 |
| c - oil phase structurant | about 10 to about 30 | about 15 to about 25 |

In polymerising polyacrylamides having anionic or cationic co-monomeric species, sub ranges within these general ranges are particularly appropriate. Thus, for making cationic copolymers, it is desirable to use a relatively high proportion of component b—the low HLB emulsifier. Typically this will be in the range 37 to 43%, particularly about 40%, with the proportion of component a—the polymeric carboxylic surfactant 32% to 38%, particularly about 35%, and component c—the oil phase structurant 22% to 28%, particularly about 25%. A typical composition would be: a:35%, b:40%, c:25%. Similarly, for making anionic copolymers, it is desirable to use a relatively high proportion of component a—the polymeric carboxylic surfactant. Typically this will be in the range 47 to 53%, particularly about 50%, with the proportion of component b—the low HLB emulsifier 22% to 28%, particularly about 25%, and component c—the oil phase structurant 22% to 28%, particularly about 25%. A typical composition would be: a:50%, b:25%, c:25%.

The surfactant system is typically used in as low a concentration as is practical as the use of higher concentrations not only increases the cost, but will also make the polymer emulsion more difficult to invert in end use treatments. Typically the surfactant system is used in an amounts of from 2.5 to 7%, but more usually from about 3 to about 4%, by weight of total emulsion.

In addition to acrylamide itself, the monomers that can be used in making polyacrylamide include substituted acrylamides, such as dimethylaminoethyl (meth)acrylate and/or trimethylaminoethyl (meth)acrylate chloride, and/or other nitrogen containing copolymerisable monomers, such as dimethyldiallylammonium chloride, included to make the polymer generated cationic and acidic copolymerisable monomers such as (meth)acrylic acid included to make the polymer generated anionic. The proportion of comonomers included depends on the desired level of canonicity or anionicity desired in the polymer. Typically when used amounts of comonomers can vary from a few percent up to about 80 weight % based on the total polymerisable monomers used. The inclusion of such comonomers is well known in the manufacture of polyacrylamides for water treatment uses.

The general process methodology for carrying out the polymerisation according to the invention is broadly similar to conventional inverse acrylamide emulsion polymerisation processes. Thus the monomer(s) are dissolved in water, generally in an amount of about 20 to about 80% by weight of total emulsion, together with chain transfer agents, catalysts, initiators and sequesterants as required, this solution is dispersed in the oil, which includes the particular surfactant combination and the polymerisation is initiated e.g. by heating. Generally the oil phase of the emulsion is generally from about 5 to about 50%, desirably about 25 to about 40% percent of the emulsion and the aqueous phase correspondingly comprises about 95 to about 50%, desirably about 75 to about 60%, by weight of the emulsion. The ratio of the aqueous phase to oil phase is typically in from about 0.5:1 to about 3:1, and is usually about 2:1 by weight.

In inverse emulsion polymerisationation the external oil phase provides heat dissipation, so that high molecular weight products can be made by polymerisation of the monomer(s). The viscosity of the external phase is an important factor, as a higher viscosity of the external phase will lead to a higher emulsion viscosity and lower Brownian motion thus reducing the probability for particle flocculation or coalescence and increasing the emulsion stability. Generally higher viscosity is aligned with higher density and this represents a further advantage in using vegetable oils.

However, a higher emulsion viscosity may reduce heat dissipation. Any difficulty in this may be met by minor adjustment of the ratio of internal to external volume fraction of the emulsion to control the emulsion viscosity to a desired value. For polymerisation in vegetable oil, the internal volume fraction (acrylamide in water) may be slightly lowered (from 70% to 60%) compared to polyacrylamide (PAM) emulsions in isoparaffinic oils. In practice, the reduced volume fraction of internal phase can be compensated by increasing the monomer content of the disperse aqueous phase.

Typically the product polymers will have a minimum molecular weight of about 3 kD, but more usually the molecular weight is at least about 20 kD, more desirably more than about 100 kD and especially desirably more than about 1 MD. Typically the maximum molecular weight is up to about 10, particularly up to about 4, MD After polymerisation, the internal (disperse) phase of the emulsion is the acrylamide (co)polymer dissolved in water. As this solution may be a gel rather than a true liquid, the term "emulsion" may not be strictly correct, but is used in the art and is retained for clarity here. As is noted above, when pure vegetable oils are used, the volume fraction of the internal phase may be a little lower in the invention as compared with when paraffinic external phases are used. The content of polymer can be maintained by increasing the concentration of monomer in the aqueous phase. Alternatively or in addition the polymer content of the polymerised emulsion can be increased by distilling off solvent from the system. One commercially important reason for such distillation is to reduce the amount of (otherwise inert) water carried with the desired polymer. The material removed by distillation will usually be a mixture of water and the external phase solvent, particularly if an azeotropic system is formed. For distillation at or about normal water distillation temperatures, the main liquid removed will usually be water carrying some of the external phase solvent. Further external phase solvent can be removed by introducing further water into the system in effect using steam distillation. Similarly, when blends of paraffinic and ester based oil are used in the external phase, the paraffinic oil can be partly or wholly removed by distillation in this way. The effect of distillation, particularly if mainly water is removed may be that the internal phase volume fraction will decrease, but the overall concentration of polymer can increase.

The polymer emulsions will before end use as flocculants, usually have added to them a further surfactant or surfactant formulation which promotes effective emulsion inversion on dilution into water. Typical inversion agents include relatively hydrophilic (high HLB) usually non-ionic surfactants such as alcohol polyethoxylates or mixed poly(ethoxylate/propoxylates).

The invention is illustrated by the following Examples. All parts and percentages are by weight unless otherwise stated.

Materials Used

AIBN 2,2-azobis-iso-butyronitrile

The surfactant compositions were made up from:

Component A: polymeric surfactant
 A1 a block co-polymer of the general formula (II) above as described in EP 0000424)
 A2 a long chain hydrocarbyl substituted succinic acid derivative as described in U.S. Pat. No. 4,786,681
 A3 a complex ester reaction product of long chain hydrocarbyl substituted succinic anhydride and polyethylene glycol as described in U.S. Pat No. 4,256,605

Component B: low HLB primary emulsifier
 B1 sorbitan mono-oleate
 B2 sorbitan mono (rapeseed oil fatty acid)
 B3 glycerol mono and dioleate
 B4 oteic acid diethanolamide Component C: wax type to stabilise pre-emulsion (vegetable oil)
 C1 yellow (unbleached) beeswax, viscosity 1500–2000 mpa.s, ex Mosselman
 C2 20 EO sorbitol beeswax derivative ex ICI Surfactants
 C3 6 EO sorbitol beeswax derivative ex ICI Surfactants
 C4 Cera Bellina—polyglyceryl-3-beeswax viscosity 6500 mPa.s (ex Jan Dekker lnt)
 C5 white Jojoba wax ex Floratech Ltd
 C6 Hoechst wax S a montane wax—$C_{28}$–$C_{32}$ straight chain saturated carboxylic acid esters ex Hoechst Monomers

| | |
|---|---|
| AM | acrylamide |
| AA | acrylic acid |
| DADMAC | dimethyldiallylammonium chloride |
| DMAEM | dimethyaminoethyl methacrylate |

Equipment

Pre-emulsions were made using a Silverson high shear mixer.

All polymerizations were carried out in 1 liter temperature resistant glass reactor in a thermostatic water bath, equipped with a p.t.f.e blade stirrer, a p.t.f.e coated PT 100 thermometer, a cooling loop (water flow control through electronically driven valves), a nitrogen inlet and an initiator inlet (fed by a RAZE model A-99 syringe pump).

The product polyacrylamide emulsion was filtered through a 80 micrometer polypropylene filter, or a 160 micrometer nylon filter (high viscosity emulsions).

Methods

The following production procedures were used to polymerise acrylamide using oil soluble and water soluble initiator:

With water soluble redox initiators, the following procedure was used:
1. Purge aqueous phase and oil phase separately with nitrogen for 20 minutes;
2. Add the oil phase to mixing beaker of the Silverson mixer;
3. Start the mixer and add aqueous phase slowly to the oil phase in the mixing beaker under continuous nitrogen purging;
4. Stir for 4 minutes at maximum speed;
5. Transfer the pre-emulsion into the reaction vessel and purge for 20 minutes with nitrogen whilst stirring at 250 rpm (ca 4 Hz); maintain the temperature of the water bath at 50±° C.;
6. at a reaction temperature of 45±1° C. and after increasing the stirrer speed to 800 rpm (ca 13 Hz), start the initiator feed; 10 ml of 0.15% $Na_2S_2O_5$ in demineralised water for 500g emulsion added during period of 4 hours;
7. After addition of initiator, feed mop-up to the emulsion 4 ml of 15.0% $Na_2S_2O_5$ in demineralised water for 500 g emulsion, added over period of about 30 minutes;
8. After completion of the polymerisation, the emulsion was filtered and the residue on the filter was measured.

Polymerisation with dissociative, oil soluble initiator (AIBN)

Similar procedure to except that in step 6–7:
6. Add all initiator (1 ml of 1 part AIBN in 5 parts acetone for 500 g emulsion) at once when the temperature of the pre-emulsion reaches 40±1° C.
7. Polymerise for 6 hours whilst purging with nitrogen Test methods Viscosity was measured by Brookfield, RVF spindle 6, speed 10. Results are given in mPa.s Particle size was measured using a LS Particle Size Analyser (Coulter), or estimated using a Zeiss microscope with video printer.

Coagulum content was determined by weighing the cooling loop and nitrogen inlet before and after polymerisation and weighing the filtrate of the emulsion on a 80 micrometer polypropylene filter or 160 micrometer nylon filter. The amount of coagulum was the sum of the weight differences of the cooling loop and nitrogen inlet and the weight of filtrate. The coagulum content was expressed as a weight percentage based on the total amount of emulsion.

Distillation—When the polymerised emulsion was distilled to remove solvent (water and/or oil) this was carried out under vacuum at 50 mbar on a water bath at 100° C.

EXAMPLES 1 TO 5

These Examples illustrate the manufacture of a cationic polyacrylamide using a redox initiator, as described in procedure A above.

| | Material | parts by weight |
|---|---|---|
| External phase: | rape seed oil | 222 |
| | primary emulsifier | |
| | A1 | 7 |
| | B1 | 8 |
| | C | 5 |
| Internal phase: | AM | 98 |
| | DMAEM | 98 |
| | demineralised water | 100 |
| | HCl (37%) | to pH 5 |
| | EDTA (5%) | 5.2 |
| | KBrO3 (1.5%) | 6 |
| | CuSO4.5H2O (1%) | 3 |

The following components C were evaluated: Example 1: C1, 2: 4, 3: C2, 4: C5, 5: C6. In each Example, the amount of coagulum was less than 1.5% on total emulsion.

EXAMPLE 6

Example 1 was repeated except that a dissociative initiator (AIBN) was used (0.03% on total emulsion). At similar internal volume fractions acrylamide emulsions in vegetable oil show a higher viscosity than emulsions in iso-paraffinic solvents. Hence heat dissipation during exothermic reaction peaks could give raise to higher coagulum levels. Coagulum levels obtained with AIBN (<1% on total emulsion) opposite sodium metabisulphite in a formulation as described in Example 1 indicate that both redox and dissociative initiators or oil and water-soluble initiators may be used to initiate the polymerisation reaction of acrylamide copolymers in vegetable oil.

EXAMPLE 7

Example 5 was repeated but using a lower level of cationic co-monomer (10 to 15%) and a redox initiator, as described in procedure A above. The following amounts of AM, DADMAC (instead of the DMAEM used in Example 5) and water were used:

| | Material | parts by weight |
|---|---|---|
| Internal phase: | AM | 176 |
| | DADMAC | 20 |
| | demineralised water | 150 |

The amount of coagulum produced was similar to that in Example 5. This Example shows that stable polyacrylamide emulsions with low coagulum formation during reaction can be made independent of the level of ionic co-monomer.

EXAMPLES 8 AND 9

These Examples illustrate the manufacture of anionic polyacrylamides with varying content of anionic co-monomer using a redox initiator, as described in procedure A above.

|  | Material | parts by wt Ex 8 | parts by wt Ex 9 |
|---|---|---|---|
| External phase: | rape seed oil | 222 | |
| | primary emulsifier | | |
| | A1 | 10 | |
| | B1 | 5 | |
| | C1 | 5 | |
| Internal phase: | AM | 137 | 45 |
| | AA | 59 | 151 |
| | demineralised water | 120 | 80 |
| | NaOH (50%) | to pH 6 | |
| | EDTA (5%) | 5.2 | |
| | KBrO3 (1.5%) | 6 | |
| | CuSO4.5H2O (1%) | 3 | |

The amount of coagulum produced was similar to that in Example 1.

EXAMPLE 10

Example 10 was a repeat of Example 1, but using methyl oleate as the external phase oil and the monomers AM and DMAEM in a 50:50 weight ratio. The product viscosity was 400 mPa.s. In this Example, the external phase has a specific gravity (0.85) between that of isoparaffinic (0.78) and vegetable oils (0.92). The final emulsions have a lower viscosity than similar formulations in vegetable oil, and show an excellent long term stability (no sedimentation or bleeding after 6 months).

EXAMPLES 11 AND 12

These Examples illustrate the use of a mixture of mineral oil and a vegetable oil as the external phase in inverse PAM polymerisation.

|  |  | parts by wt | |
|---|---|---|---|
| | Material | Ex 11 | Ex 12 |
| External phase: | Isopar L | 67.2 | 67.2 |
| | Isopar E | 33.6 | 33.6 |
| | rapeseed oil | 67.2 | 67.2 |
| | primary emulsifier | | |
| | A1 | 7 | |
| | A2 | | 10 |
| | B1 | 8 | 5 |
| | C1 | 5 | 5 |
| Internal phase: | AM | 96.5 | 135 |
| | DMAEM | 96.5 | 0 |
| | AA | 0 | 58 |
| | aq demin | 175 | 179 |
| | HCl/NaOH | to pH 5 | to pH 6 |
| | EDTA (5%) | 5.2 | 5.2 |
| | KBRO3 (1.5%) | 6 | 6 |
| | CUSO4.5H2O (1%) | 3 | 3 |

After the polymerisation was complete, the emulsion was subjected to azeotropic distillation to remove water and the isoparaffinic solvent (85% of the isoparaffinic solvent/water combination is removed) to yield an emulsion containing less than 5% of mineral oil. The polymeric surfactant ensures the stability during distillation. The active acrylamide polymer content of the distilled emulsion was nearly 50%.

EXAMPLE 13

Examples 13 and 14 were repeated except that sunflower oil was substituted for the rape seed oil in the external phase.

EXAMPLE 14

Examples 13 and 14 were repeated except that Canola oil was substituted for the rape seed oil in the external phase.

EXAMPLE 17

Examples 12 to 14 were repeated except that the monomers used were AM and Acrylic acid in a weight ratio of 23:77.

EXAMPLE 18

Examples 14 to 16 were repeated except that the monomers used were AM and DADMAC acid in a weight ratio of 90:10.

EXAMPLE 19

Examples 14 to 16 were repeated except that the monomers used were AM and DMAEM in a weight ratio of 50:50.

What is claimed is:

1. A method of making polyacrylamide by inverse emulsion polymerisation which comprises dispersing an aqueous solution of polymerisable monomers including acrylamide in an oil phase including at least one ester based oil, wherein the system also includes a surfactant composition which includes:

a polymeric carboxylic surfactant b a low HLB emulsifier; and c an oil phase structurant, and polymerising the polymerisable monomers to form a colloidal suspension of the resulting polyacrylamide polymer particles, in water, in the oil.

2. A method as claimed in claim 1 wherein the polymeric carboxylic surfactant is or includes at least one compound of the formula (I):

$$R^1.X_n.CO.R^2 \quad (I)$$

where $R^1$ is a polymeric hydrophobe group containing the least 30 carbon atoms;

X is a linking group;

n is 0 or 1; and $R^2$ is a hydrophile group.

3. A method as claimed in claim 1 wherein the polymeric carboxylic surfactant is or includes at least one block polyester polyalkylene glycol copolymer of the formula (II):

$$A\text{—}B\text{—}A \quad (II)$$

where each group A is independently a monocarboxylate group of a polyester; and

B is a divalent polyalkylene oxide residue.

4. A method as claimed in claim 1 wherein the polymeric carboxylic surfactant is or includes at least one long chain hydrocarbyl substituted succinic acid derivative of a hydrophile compound.

5. A method as claimed in claim 1 wherein the polymeric carboxylic surfactant is or includes at least one complex ester made by reacting long chain hydrocarbyl substituted succinic acids and polyalkylene glycols, and optionally one or more polyhydric alcohols and/or monocarboxylic acids.

6. A method as claimed in claim 1 wherein the low HLB emulsifier is a sorbitan fatty acid ester.

7. A method as claimed in claim 6 wherein the low HLB emulsifier is sorbitan oleic acid ester.

8. A method as claimed in claim 1 wherein the oil phase structurant is a waxy ester which is solid at ambient temperature, and in which either or both the fatty acid residue and the alcohol residue are long chain residues.

9. A method as claimed in claim 8 wherein the oil phase structurant is beeswax, jojoba wax, montan wax or a mixture of these.

10. A method as claimed in claim 1 wherein the oil phase structurant is or includes a derivative of a waxy ester which is one or more of: ethoxylated sorbitol esters of beeswax fatty acids; triglycerol tri-beeswax fatty acid esters; ethylene glycolesters of montan wax fatty acids; glycerol esters of montanic acid; and montanic acid partially esterified with butylene glycol and saponified with calcium hydroxide.

11. A method as claimed in claim 1 wherein the oil phase structurant has a melting point in the range 60 to 85° C.

12. A method as claimed in claim 1 wherein the ester based oil is one or more esters of a $C_{12}$ to $C_{20}$ fatty acid with a $C_1$ to $C_{10}$ hydroxyl compound which are liquid at ambient temperature.

13. A method as claimed in claim 12 wherein the fatty acid residue of the ester based oil is derived from one or more $C_{14}$ to $C_{18}$ mono-unsaturated fatty acids.

14. A method as claimed in claim 13 wherein the fatty acid is oleic acid.

15. A method as claimed in claim 14 wherein the oleic acid contains less than 10% linoleic and less than 5% linolenic acid residues.

16. A method as claimed in claim 13 wherein the fatty acid is derived from sunflower oil, soya oil, peanut oil and or rape seed oil.

17. A method as claimed in claim 14 wherein the fatty acid contains less than 2% erucic acid residues.

18. A method as claimed in claim 13 wherein the hydroxyl residue of the ester based oil is derived from a $C_1$ to $C_{10}$ monohydric alcohol, or a polyhydroxyl compound.

19. A method as claimed in claim 18 wherein the hydroxyl compound is glycerol, or methyl, ethyl, butyl, iso-butyl, or ethyl-hexyl alcohol.

20. A method as claimed in claim 1 wherein the ester oil is rape seed oil or canola oil or of the methyl ester of rape seed oil or canola oil fatty acids.

21. A method as claimed in claim 1 wherein the oil phase includes one or more paraffinic oils and the proportion of ester based oil is at least 40% by weight of the oil phase used.

22. A method as claimed in claim 1 wherein the surfactant composition comprises from about 30 to about 55% by weight polymeric carboxylic surfactant, from about 20 to about 45% by weight low HLB emulsifier, and from about 10 to about 30% by weight oil phase structurant.

23. A method as claimed in claim 22 wherein the surfactant composition comprises from about 35 to about 50% by weight polymeric carboxylic surfactant, from about 25 to about 40% by weight low HLB emulsifier, and from about 15 to about 25% by weight oil phase structurant.

24. A method as claimed in claim 1 wherein the amount of the surfactant composition used is from 2.5 to 7% by weight of total emulsion.

25. A method as claimed in claim 1 wherein the polymerisable monomers comprise one or more of substituted acrylamides and/or other nitrogen containing copolymerisable monomers included to make the polymer generated cationic.

26. A method as claimed in claim 25 wherein the polymerisable monomers included to make the polymer generated cationic include one or more of dimethylaminoethyl (meth)acrylate and/or trimethylaminoethyl (meth)acrylate chloride and dimethyldiallylammonium chloride.

27. A method as claimed in claim 25 wherein the surfactant composition comprises from 32% to 38% by weight polymeric carboxylic surfactant, from 37 to 43% by weight low HLB emulsifier, and from 22% to 28% by weight oil phase structurant.

28. A method as claimed in claim 1 wherein the polymerisable monomers comprise one or more acidic copolymerisable monomers included to make the polymer generated anionic.

29. A method as claimed in claim 28 wherein the acidic copolymerisable monomer is acrylic acid, methacrylic acid or a mixture of these.

30. A method as claimed in claim 28 wherein the surfactant composition comprises from 47 to 53% by weight polymeric carboxylic surfactant, from 22% to 28% by weight low HLB emulsifier, and from 22% to 28% by weight oil phase structurant.

31. A method as claimed in claim 1 wherein the ratio of the aqueous phase to oil phase is from about 0.5:1 to about 3:1 by weight.

32. A surfactant combination including: a) a polymeric surfactant; b) a low HLB emulsifier; and c) an oil phase structurant.

33. A surfactant combination as claimed in claim 32 wherein the polymeric carboxylic surfactant is or includes at least one compound of the formula (I):

$$R^1.X_n.CO.R^2 \qquad (I)$$

where
  $R^1$ is a polymeric hydrophobe group containing the least 30 carbon atoms;
  X is a linking group;
  n is 0 or 1; and
  $R^2$ is a hydrophile group.

34. A surfactant combination as claimed in claim 32 wherein the polymeric carboxylic surfactant is or includes at least one block polyester polyalkylene glycol copolymer of the formula (II):

$$A\text{—}B\text{—}A \text{ tm (II)}$$

where
  each group A is independently a monocarboxylate group of a polyester; and
  B is a divalent polyalkylene oxide residue.

35. A surfactant combination as claimed in claim 32 wherein the polymeric carboxylic surfactant is or includes at least one long chain hydrocarbyl substituted succinic acid derivative of a hydrophile compound.

36. A surfactant combination as claimed in claim 32 wherein the polymeric carboxylic surfactant is or includes at least one complex ester made by reacting long chain hydrocarbyl substituted succinic acids and polyalkylene glycols, and other ingredients including polyhydric alcohols and/or monocarboxylic acids.

37. A surfactant combination as claimed in claim 32 wherein the low HLB emulsifier is a sorbitan fatty acid ester.

38. A surfactant combination as claimed in claim 37 wherein the low HLB emulsifier is sorbitan oleic acid ester.

39. A surfactant combination as claimed in claim 32 wherein the oil phase structurant is a waxy ester which is solid at ambient temperature, and in which either or both the fatty acid residue and the alcohol residue are long chain residues.

40. A surfactant combination as claimed in claim 39 wherein the oil phase structurant is beeswax, jojoba wax, montan wax or a mixture of these.

41. A surfactant combination as claimed in claim 32 wherein the oil phase structurant is a derivative of a waxy ester which is one or more of: ethoxylated sorbitol esters of beeswax fatty acids, triglycerol tri-beeswax fatty acid esters; ethylene glycol esters of montan wax fatty acids; glycerol esters of montanic acid; and montanic acid partially esterified with butylene glycol and saponified with calcium hydroxide.

42. A surfactant combination as claimed in claim 32 wherein the oil phase structurant has a melting point in the range 60 to 85° C.

43. A method of water treatment that comprises diluting an inverse polyacrylamide emulsion, made by the method claimed in claim 1 or made using a surfactant combination claimed in claim 32, into the water to be treated such that the emulsion is inverted, releasing the polyacrylamide into the water and emulsifying the ester based oil phase in the dilution water.

\* \* \* \* \*